United States Patent [19]

Duwe

[11] Patent Number: 4,815,557

[45] Date of Patent: Mar. 28, 1989

[54] DOWN HOLE SEISMOGRAPHIC SOURCE

[75] Inventor: William D. Duwe, Broken Arrow, Okla.

[73] Assignee: Seismograph Service Corporation, Tulsa, Okla.

[21] Appl. No.: 66,919

[22] Filed: Jun. 25, 1987

[51] Int. Cl.⁴ .............................................. G01V 1/40
[52] U.S. Cl. ................................... 181/106; 181/119; 367/143; 367/171; 367/172; 367/911
[58] Field of Search ............... 367/143, 166, 167, 171, 367/172, 174, 175, 911, 912, 25; 181/102, 106, 113, 119, 120, 121, 400, 401, 402

[56] References Cited

U.S. PATENT DOCUMENTS

| 3,221,833 | 12/1965 | Malmberg | 181/0.5 |
|---|---|---|---|
| 3,718,205 | 2/1973 | Fair et al. | 181/0.5 H |
| 4,030,063 | 6/1977 | Wallen | 181/120 X |
| 4,252,210 | 2/1981 | Sodich | 181/119 |
| 4,569,412 | 2/1986 | Bouyoucos et al. | 181/119 |
| 4,648,478 | 3/1987 | Dedole et al. | 181/106 |
| 4,702,343 | 10/1987 | Paulsson | 181/106 |

Primary Examiner—Brian S. Steinberger
Attorney, Agent, or Firm—Martin M. Santa; Richard M. Sharkansky

[57] ABSTRACT

A seismic energy source provides a bias pressure and oscillating pressure force on a piston mounted transversely to the major axis of the well bore and in pressure contact with the wall of the well bore. A seismographic energy wave is generated in the surrounding earth by oscillating the pressure of the piston against the well wall. This apparatus uses the pressure of ambient fluid in the well bore to reduce the power required to provide pressure contact and to oscillate the piston against the wall.

12 Claims, 3 Drawing Sheets

DOWN HOLE SEISMOGRAPHIC SOURCE

This invention relates to seismographic energy sources and particularly to a vibrating seismographic source adapted for use inside a well bore.

BACKGROUND OF THE INVENTION

Seismographic energy sources and geophone detectors are used to obtain a profile of geophysical formations beneath the earth's surface and are particularly important in the exploration for new reserves of oil, gas, and other natural resources. The source provides energy to the earth in an impulsive or vibratory manner. Detectors are placed at some distance away from the source. By analyzing electrical signals provided by the detectors, the location of sought-after formations may be determined.

One common technique is to use a surface energy source and bore hole detectors. In this technique, a well bore is drilled in the earth. A detector or an array of several detectors is lowered into the well bore. A profile is obtained by actuating the surface source and recording the detector outputs. The source is then moved and another profile is taken. Multiple profiles are normally required to adequately understand a formation. This technique is known as vertical seismic profiling. One disadvantage is the need to move and reenergize the source for each profile - as a result, the source is usually mounted on a mobile platform. Another disadvantage is that the number of detectors in the well bore is limited and only one record from each detection is provided by actuation of the surface source. Also, surface rubble and structures tend to attenuate source energy, and thus the source must necessarily be larger than would otherwise be required.

Another technique known as reverse vertical seismic profiling (in which this invention may be desirable used) places a source in the well bore (called a downhole source) and an array of detectors on the surface. Multiple profiles may be more easily taken as the source is easily moved to another location by raising or lowering a cable that supports it in the well bore. An advantage of reverse vertical profiling is that a large amount of data is recorded from the array of detectors for each source energization.

One type of prior-art downhole source is known as an air gun. The air gun provides a rapid release of pressurized air to an outlet placed in fluid in the well bore. The rapid air release provides an impulsive seismographic energy wave. Several problems are associated with air guns. A tube wave or secondary harmonic energy is created when the primary energy wave reflects off the well bore bottom and then the fluid surface, and continues to oscillate between the surface and bottom. This tube wave distorts the energy transmitted to the earth. As multiple profiles are taken, the well bore fluid becomes aerated and thus more elastic, also distorting transmitted energy. Another problem is the need to feed pressurized air from the surface to depths commonly reaching ten to twenty thousand feet. Finally, the air gun is an impulsive source, providing energy in a wide bandwidth. It is often desirable to use bandlimited energy, as it provides a more easily interpreted profile.

U.S. Pat. No. 4,252,210 issued Feb. 4, 1981, to Sodich shows a downhole source. An elongate tubular expandable packer is placed in the well bore and rapidly expanded to create a seismic energy wave. However, the expansion of this device requires overcoming any ambient pressure in the well bore. This becomes a problem if the expandable packer is used in a deep well bore. Also, one must wait for the packer to collapse before moving it to another level in the bore.

U.S. Pat. No. 3,221,833 issued Dec. 7, 1965, to Malmberg and assigned to General Dynamics Corporation of New York, N.Y., is a seismographic source using pistons to engage a well bore. This device must also overcome the ambient pressure in the well bore to operate, is not collapsible in case of a valve malfunction, and if its valves malfunction, may become stuck in the well bore.

SUMMARY OF THE INVENTION

It is thus an object of this invention to provide a downhole source that is easy to place in a well bore, energize, and move from place to place, and is not susceptible to becoming stuck in the bore in the event of a malfunction.

The downhole source is a vibrating-type source providing oscillatory energy in a controllable band of frequencies.

It is also an object to provide a source which requires less energy to operate than standard surface vibrators, air guns, or hydraulic sources which must overcome the high ambient pressures found deep in a well bore.

Another object is to have the source provide most of its energy to the earth and to minimize energy coupled to fluid in the well bore in order to minimize tube wave effects.

These and other objects are accomplished by a seismic energy source featuring a bias pressure and oscillatory pressure force on a piston mounted transversely to the major axis of the well bore. The transverse piston is in pressure contact with the wall of the well bore. Apparatus is provided to create a seismographic energy wave by oscillating the pressure of the piston against the well wall. This apparatus uses the pressure of ambient fluid in the well bore to reduce the power required to oscillate the piston against the wall.

Advantages of the seismographic source described here include compact size and thus transportability, while being capable of operation in high pressure environments. It also minimizes tube wave generation.

BRIEF DESCRIPTION OF THE DRAWINGS

These and other objects, novel features, and advantages become apparent upon examination of the accompanying drawings, where.

DETAILED DESCRIPTION OF THE PREFERRED EMBODIMENTS

Figure 1:
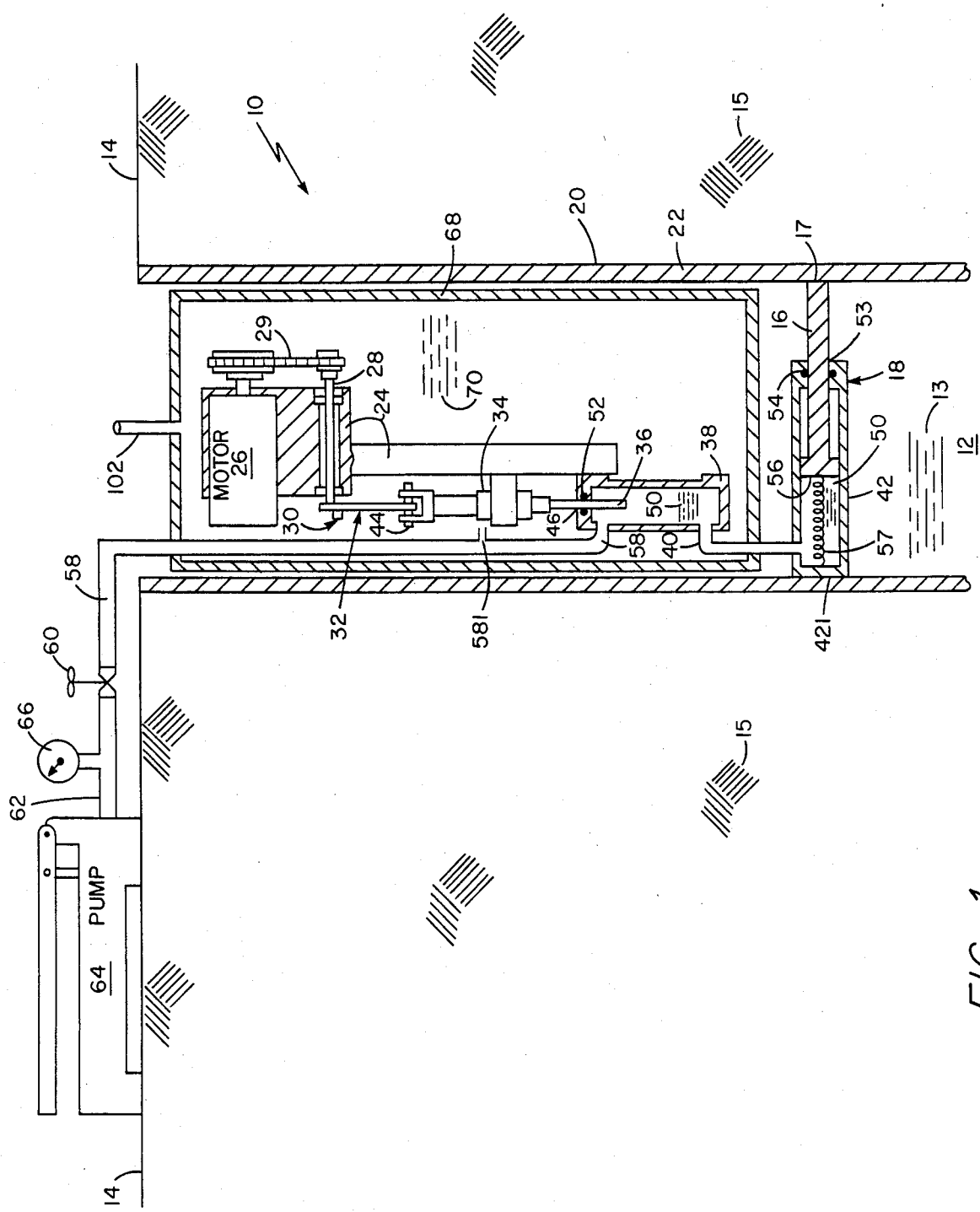
FIG. 1 is a schematic cross-sectional view of one embodiment of the invention.

Turning attention now to the drawings, where like reference characters designate corresponding parts throughout the several figures, there is shown in FIG. 1 a partially cutaway schematic of a seismographic downhole energy source 10 adapted for placement into a well bore 12, containing fluid 13, formed in the earth 15 from the surface 14. Source 10 includes a transverse piston 16 and force means 18 for applying pressure to an end 17 of the transverse piston 16 against a side wall 20 of bore hole 12. Wall 20 is typically cylindrical and may be further defined by a conventional metallic conformal well casing 22, in which cylinder 42 and its piston 16 is pressed against an inner wall of casing 22.

Force means 18 may be further defined as a main support member 24 (shown partially broken away) coupled to an electric motor 26, driveshaft 28, crankshaft 30, link 32, linear bearing 34, cylinder rod 36, upper cylinder 38, fluid coupling 40, and transverse cylinder 42. Motor 26, driveshaft 28, crackshaft 30, link 32, and linear bearing 34 are conventional in design and arrangement, and serve to provide an up and down oscillating motion to cylinder rod 36. Motor 26 provides rotating motion to driveshaft 28 using drivebelt 29 and then to crankshaft 30. Motor 26 might be directly coupled to crankshaft 30. Crankshaft 30 via offset cam motion provides vertical motion via link 32 through link coupler 44 to linear bearing 34. Vertical linear oscillating motion is thus given to cylinder rod 36. Portions of force means 18 including motor 26, driveshaft 28, belt 29, crankshaft 30, link 32, linear bearing 34, upper cylinder 38, and fluid coupling 40 are placed inside an enclosed chamber 68. Chamber 68 is filled with a compressible fluid 70 such as air or hydraulic fluid and compressible gas.

Cylinder rod 36 penetrates upper cylinder 38 at an opening 46. Cylinder 38 is filled preferably with a substantially non-compressible fluid 50 such as hydraulic fluid or a suitable liquid fluid. Annular seal 52 serves to keep fluid 50 from escaping upper cylinder 38. Thus, as cylinder rod 36 oscillates, the pressure of fluid 50 in upper cylinder 38 also oscillates. The oscillating pressure in fluid 50 is in turn fed through fluid coupling 40 to transverse cylinder 42, since both fluid coupling 40 and transverse cylinder 42 are also filled with fluid 50. Upper cylinder 38, fluid coupling 40, and transverse cylinder 42 may be formed as a single unitary cylinder, as will be seen in a later description of other embodiments. If fluid 50 is slightly compressible as would result by having a gas (such as air) in cylinder 38 in addition to the hydraulic fluid, the oscillatory pressure will be reduced for a given translation of cylinder rod 36.

Transverse cylinder 42 is adapted to slidably engage piston 16 via an opening 53 and to provide fluid 50 pressure to end 56 of piston 16. End 17 of piston 16 and end 421 of cylinder 42 are in contact with opposite regions of bore wall 20 or casing 22. Annular seal 54 serves to prevent fluid 50 from escaping transverse cylinder 42. Thus, as the pressure in fluid 50 oscillates about a preload value, so too does the force on bore side wall 20. A spring 57 may be attached between piston 16 and cylinder 42. Spring 57 assists in keeping piston 16 retracted when raising and lowering source 10 during which process the pressure in fluid 50 is reduced by opening valve 60 to allow retraction.

Upper cylinder 38 also has a preload inlet pipe 58 for allowing fluid 50 to be given a preload static pressure. Inlet pipe 58 is coupled to valve 60, hose 62, and pump 64. A pressure gauge 66 may be inserted at hose 62 to measure preload static pressure. Pump 64 is shown as an hand hydraulic pump but may also be electric or gasoline driven.

The pressure of compressible fluid 70 inside chamber 68 and the preload pressure of the preferably noncompressive fluid 50 in upper cylinder 38 ad transverse cylinder 42 is set to be above the ambient pressure of well bore fluid 13 into which source 10 is immersed in operation so that the power required for motor 26 to drive cylinder rod 36 and hence piston 16 is reduced. An opening 581 from inlet pipe 58 to the interior of chamber 68 is provided to pressurize fluid 70 to the same pressure as fluid 50. In this case, fluid 70 is also a hydraulic fluid with air or another gas contained within chamber 68 to cause fluid 70 to be compressible. The opening 581 has substantial resistance to fluid 50 flow in order to allow the pressure of fluid 50 to oscillate over a substantial value by the motion of piston 16 by isolating fluid 50 from the compressible fluid 70. Alternatively, a separate pump, gauge, valve (all not shown) and pipe corresponding to items 64, 66, 60, and 58 could be connected to chamber 68 to raise the pressure of compressible fluid 70 to the same preload pressure as fluid 50.

In operation, source 10 is lowered into well bore 12 to a position above or in the upper portions of any well bore fluid 13. Source 10 is preferably tethered or otherwise supported by a cable 102 containing electrical wiring for motor 26. Preload inlet pipe 58 thus necessarily includes a long enough section of hose to allow lowering source 10 to the desired location in the bore hole 12. Valve 60 is opened and pump 64 operated to pressurize fluid 50 to a preload pressure as read on gauge 66 sufficient to exceed the pressure of the fluid (air or liquid) in which source 10 is immersed to cause piston 16 to engage wall 20 with a preload pressure. The preload pressure should be sufficient for the piston 16 and cylinder 42 end 421 to maintain good firm contact with the wall 20 when oscillatory pressure is provided to pressurized fluid 50. The preload pressure should be less than that which would damage the bore well 20. Valve 60 is then closed and motor 26 energized, thereby causing piston 16 to vibrate wall 20 and hence earth 15 because of the oscillatory pressure in fluid 50 caused by ocillatory piston 36. Vibration frequency is controlled by the speed of a direct current motor 26 which is typically operated over a linear sweep of frequencies, for example, 55 to 80 Hz over a sweep time of 25 to 50 seconds, by sweeping the amplitude of the DC voltage applied to motor 26 by electric wires (not shown) in cable 102 from the surface 14.

Source 10 may be moved to another position in the bore 12 or removed entirely by cable 102 by opening valve 60 to allow the pressurized fluid 50 to return to a storage chamber in pump 64 and thereby remove the preload pressure from piston 16. Spring 57 assures that piston 16 retracts into cylinder 42 thereby allowing source 10 to be free of the wall 20.

Figure 2:
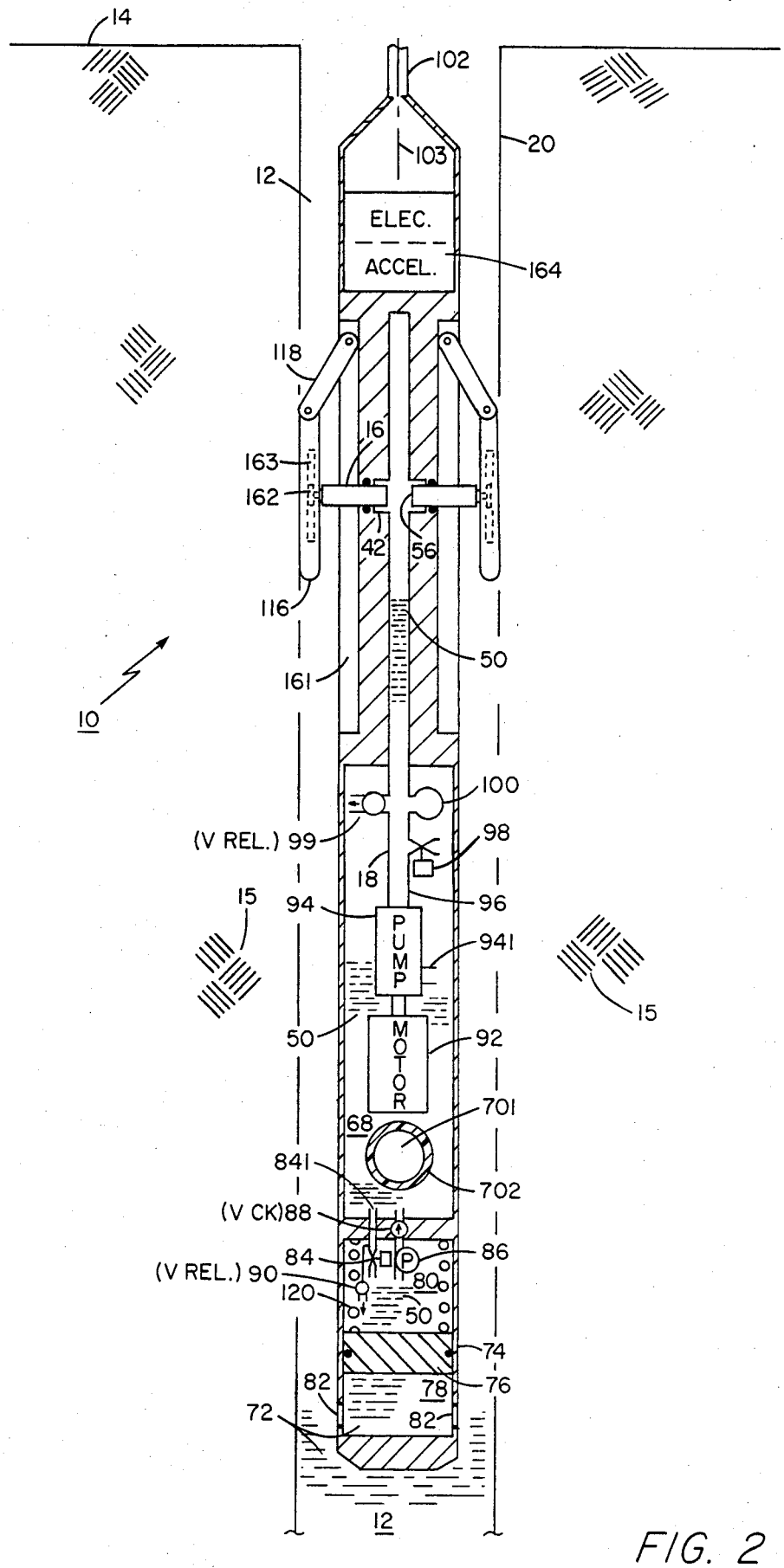
FIG. 2 is a schematic cross-sectional view of an alternate embodiment.

FIG. 2 is a schematic of another embodiment of the source 10 adapted for use in a portion of bore 12 containing high pressure ambient well fluid 72 such as mud or oil. As before, a force means 18, disposed within a main chamber 68, causes a noncompressible fluid 50 in coupling line 96 to act on piston 16 to press against side wall 20 of bore 12. Chamber 68 contains a noncompressible fluid 50 (hydraulic fluid, for example) and an air or gas 701 contained within a compressible sealed bladder 702 which in combination act as a compressible fluid. Source 10 also includes compensating cylinder 74 adjacent chamber 68. Compensating cylinder 74 has a compensating piston 76 movably positioned therein. Compensating piston 76 divides compensating cylinder 74 into a lower chamber 78 and an upper chamber 80. Holes 82 are formed in compensating cylinder chamber 78 to allow ambient well fluid 72 to enter chamber 78. A noncompressible fluid 50 in chamber 80 selectively communicates with fluid 50 in main chamber 68 through a pressure bias control valve 84, a preload pump 86 with a series connected check valve 88, and a relief valve 90. These and the other elements of source 10 are desirably formed of material, such as stainless steel, adapted to withstand the pressure and temperature extremes experienced in bore 12.

Disposed within main chamber 68 are submersible motor 92 driving pump 94. Pump 94 compresses fluid 50 in main chamber 68 to provide further-pressurized fluid 50 on piston 16 in cylinder 42 via coupling line 96. Pads 116 have a slot 163 in which head 162 of piston 16 is engaged to cause lateral movement of pad 116 to the right or left upon movement of piston 16 to the right or left, respectively. Pad 116 is rotatably attached to source 10 by at least one link 118. A recess 161 in source 10 accomodates pad 116 and link 118 when the pad is in the retracted position. Modulator valve 98 and relief valve 99 selectively allow pressurized fluid 50 in coupling line 96 to communicate directly with fluid 50 in main chamber 68. A hydraulic accumulator 100 may be coupled to coupling line 96.

Motor 92, motor-pump 86, and valves 84 and 98 are controlled by electrical signals in wires (not shown) provided by supporting cable 102 which signals are fed to source 10 from the earth surface 14. For clarity, connections from cable 102 to each device are not shown. Electronic circuitry 164, including an accelerometer, controls and senses transmitting pressure or accelerometer values to the surface 14.

In operation, as source 10 is lowered into bore 12, valve 84 is opened. Ambient fluid 72 enters chamber 78 through holes 82. The pressure of ambient fluid 72 in turn causes compensating piston 76 to compress fluid 50 in chamber 80, and also retracting spring 120 in chamber 80, and hence fluid 50 in main chamber 68 also through open valve 84 and connecting opening 841. The fluid 50 in main chamber 68 is thus provided with the same pressure as ambient fluid 72. When source 10 reaches the desired depth in bore 12, valve 84 is closed to hold the pressure in main chamber 68. Preload pump 86 in series with check valve 88 is operated after closing valve 84 and opening valve 98 to increase the pressure of fluid 50 in main chamber 68 and in coupling line 96 above that of ambient fluid 72 and the fluid 50 in chamber 80 to thereby extend piston 16 to cause its end pad 116 to press against wall 20 with the desired preload pressure. A more uniform pressure on wall 20 is obtained when pad 116 has a radius relative to axis 103 equal to that of well bore 12. For clarity of presentation, only two pistons 16/pads 116 are shown; although in practice, several non-interfering piston/ pads may be distributed around the circumference and length of source 10. Check valve 88 allows pump 86 to be deenergized when the desired pressure in chamber 68 is obtained.

After the desired preload pressure on pads 116 has been reached, motor 92 is now energized to operate pump 94, and valve 98 is open. Pump 94 thus circulates fluid 50 from a pump inlet 941 in main chamber 68 down coupling line 96 to piston 16 and also out valve 98 without necessarily increasing the pressure of fluid 50 in line 96. At this time, pad 116 is being held firmly against wall 20 as the force of fluid 50 in coupling line 96 on piston 16 inner end 56 which had been produced by pump 86 is greater than that of ambient fluid 72. To create a seismic energy wave, valve 98 is momentarily closed, allowing pressure of fluid 50 inside coupling line 96 to increase rapidly and to increase the force of piston 16/pad 116 against wall 20. Oscillating energy in the frequency band of interest is created by alternately opening and closing valve 98 at the band frequency. The frequency may be swept over a band by changing the time duration of the opening and closing of valve 98. Relief valve 99 keeps source 10 from becoming damaged if the pressure in coupling 96 is unintentionally increased, such as might occur if valve 98 malfunctions and stays closed for too long while pump 94 is operating. Relief valve 99 also functions to release the pressure on pads 116 in the event of a failure of valve 98 to open when source 10 is to be moved. Hydraulic accumulator 100 (a fluid 50 filled expandable bladder) helps to filter sharp variations in the pressure provided on piston 16 by the opening and closing of valve 98.

Thus, by pressurizing fluid 50 in main chamber 68 by pump 86 to a pressure greater than the ambient pressure of fluid 72, pump 94 need not provide the preload pressure required to overcome ambient pressure of fluid 72; and thus pump 94 may be smaller and use less energy while providing the desired oscillatory seismic energy. The fluid 50 in chamber 68 should have some compressibility as by a compressible device coupled to it (such as a bladder 702 filled with a gas fluid 701), otherwise, the action of pump 94 is inhibited.

Upon the end of oscillatory operation, valves 98 and 84 are opened, motor 92 and pump 86 are electrically deenergized to cause fluid 50 pressure to move toward equilibrium with the ambient pressure of fluid 72. Relief valves 99 and 90 may also serve to equalize fluid pressures to enable raising source 10 in the event of malfunction of valves 84, 98 in failing to open. A pulling force on cable 102 increases the inwardly directed pressure on pads 116 and pistons 16 by the action of links 118 to increase the pressure of fluid 50 in line 96 and chamber 68 to a pressure greater than that to which the relief valves 99, 90 are preset. Relief valve 90 when actuated releases fluid 50 into lower chamber 80 and expends chamber 80 by the movement of piston 76 until the pressure produced by fluid 50 and spring 120 equals that of the pressure produced by ambient fluid 72.

In normal operation of lifting source 10 with valves 84, 98 open, spring 120 in chamber 80 further reduces the pressure of fluid 50 as the ambient pressure of fluid 72 decreases as the source 10 is lifted in the well bore 12. Spring 120 should be sufficiently resistant to compression so that the pads 116 will remain retracted into the body recesses 161 of source 10 when source 10 is at its maximum operating depth and pressure with valves 98, 84 open and with pumps 94, 86 in the "off" state. Reduction of the pressure of fluid 50 by spring 120 causes ambient fluid 72 pressure to push pads 116 into the body recess 161. Piston 16, which has a capped end 162 which is captively and slidably mounted in reentrant longitudinally extending groove 163 of pad 116, moves inwardly with pad 116. In the event there is a failure of retraction of pads 116 because of a jamming malfunction, link 118 will force pad 116 and piston 16 to retract when an upward force is exerted on cable 102. Link 118 is pinned at one end to source 10 within recess 161 and at its other end to pad 116.

Figure 3:
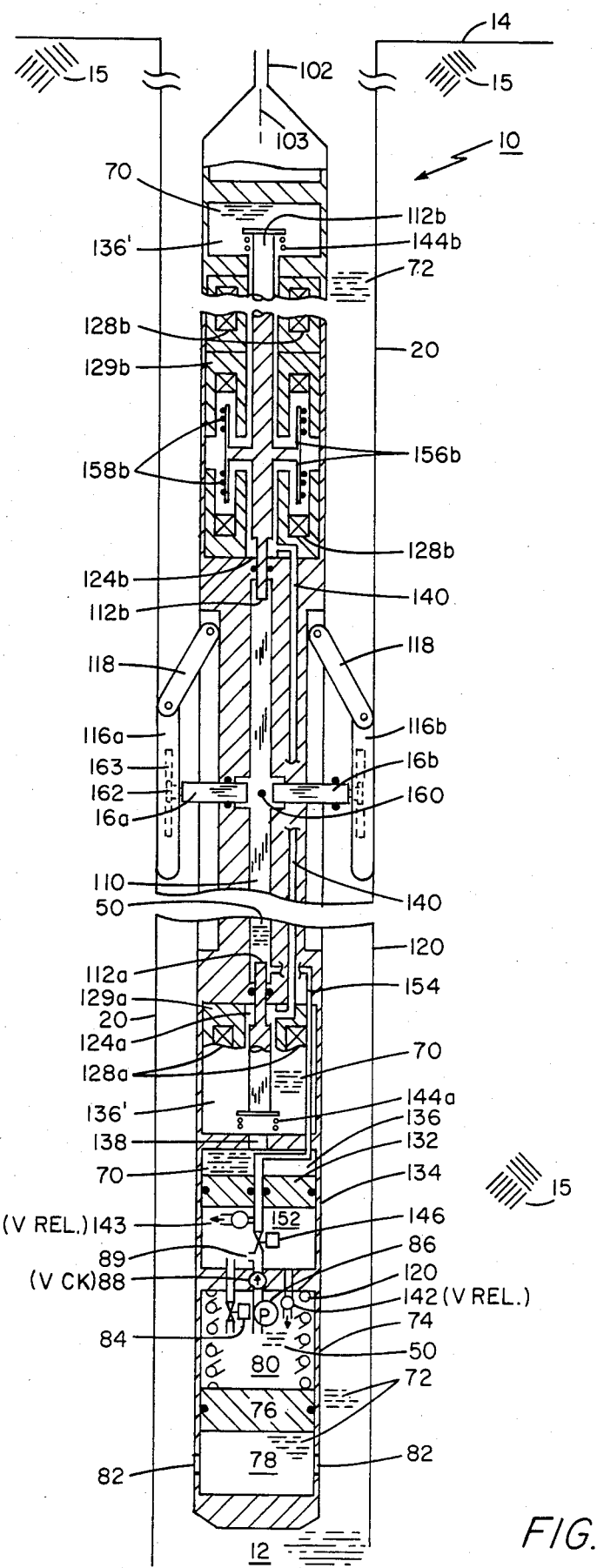
FIG. 3 is a cross-sectional view of a variation of the embodiment of FIG. 2.

FIG. 3 is a partial cross-sectional view of an alternate embodiment of the source 10 of FIG. 2, arranged to provide a different source of seismic energy.

A main chamber 110 is filled with noncompressible fluid 50 to which a static pressure and an oscillatory pressure is applied. Two vertical pistons 112a, 112b move in and out of chamber 110 in synchronism, thereby causing an oscillatory pressure in fluid 50 and causing an oscillatory force to be developed on horizontal pistons 16a, b. Horizontal pistons 16a, b are respectively coupled to hinged pads 116a, b by links 118 which couple pads 116a, b to source 10 as explained previously. Seismographic energy is thus imparted to earth 15 by the oscillatory pressure of fluid 50 in chamber 110 when vertical pistons 112a, b are caused to move toward and away from each other. Seismic energy is thus provided to earth 15 at a transmission frequency equal to the frequency of oscillation of vertical pistons 112a, b. This is typically in the range of 10 to 250 Hz. A static pressure in fluid 50 in chamber 110 causes pads 116a, b to engage the wall 20 of bore 12 with a preload pressure for reasons presented earlier.

Two or more pads, 116a, b allow a more even distribution of acoustic power to be delivered to wall 20. The large pad area also reduces the problem of excessive pressure on a small area of well bore 12 that may result in damage to well bore 12.

As in the embodiment of FIG. 2, holes 82 of source 10 allow ambient well fluid 72 to enter a lower chamber 78 formed in compensating cylinder 74 by compensating piston 76. Compensating cylinder 74 and compensating piston 76 serve to pressurize fluid 50 in chamber 80 nearly to the pressure of ambient fluid 72, while keeping the undesirable ambient fluid 72 such as mud or oil confined to the limited region of volume 78. Thus, as the pressure of ambient fluid 72 increases, piston 76 moves upwardly, thereby increasing the volume of lower chamber 78 and decreasing the volume of upper chamber 80 whose noncompressible fluid 50 is transferred to chamber 152. A compensating spring 120 is disposed within upper chamber 80 to be compressed by and to resist some of the pressure of ambient fluid 72. Spring 120 is also a convenient way to cause the fluid 50 to be at a pressure slightly lower than ambient fluid 72 and to retract pads 116a, b for movement of source 10. During the movement of source 10 up or down in well bore 12, valves 84, 146 are electrically opened to allow the pressure of fluids 50, 70 in chambers 80, 152, 110 and 136, 136', respectively, to be nearly equal to but less than that of ambient fluid 72 because of spring 120.

Vertical pistons 112a, b are disposed within cylinders 124a, b. It is desired that the pressure of noncompressible fluid 50 in upper chamber 80 be communicated to pistons 112a, b. This is accomplished by a second piston 132 disposed within a second cylinder 134 and forming a chamber 152 which communicates with chamber 80 through open valve 84. As fluid 50 from chamber 80 enters chamber 152 of second cylinder 134 through open valve 84, piston 132 is forced upward, thereby placing pressure on compressible fluid 70 within upper chambers 136, 136' of second cylinder 134. A passageway 138 couples upper chamber 136 to chamber 136'. Compressible fluid 70 is typically comprised of a noncompressible fluid and a gas, the gas preferably being contained within a sealed bladder (not shown). In this manner, the pressure on vertical pistons 112a, b is only slightly less (by the compressive force of spring 120) than that of ambient fluid 72. A coupling pipe 140 couples fluid 70 of chamber 136' of cylinder 124a to that of cylinder 124b, thereby equalizing the pressures on pistons 112a and 112b. A centering spring 144a coupled between piston 112a and a portion of cylinder 124a and centering spring 144b coupled between piston 112b and a portion of cylinder 124b serve to movably support pistons 112a, b, respectively.

After source 10 has been moved to its desired location in bore 12, the preload pressure inside main chamber 110 is established. This is accomplished by bias motor/pump 86, electrically controllable valves 146, 84, and coupling pipe 154 which penetrates second piston 132 to main chamber 110. Valve 84 is closed and valve 146 is opened during operation of motor/pump 86. Operation of pump 86 raises the pressure of fluid 50 inside chamber 110 through open valve 146 and pipe 154, creating a bias force on pistons 112a, b which causes pads 116a, b to press against wall 20 of bore 12. Pump 86 also raises the pressure of fluid 50 in chamber 152 through pipe outlet 89 thereby causing piston 132 to produce preload pressure in fluid 70 in chambers 136, 136' equal to that of fluid 50 in chamber 110.

When the pressure on pads 116a, b is at the desired preload value, pump 86 is shut off, electrically-operated valve 84 is maintained closed and the pressure of noncompressible fluid (hydraulic) 50 in chambers 152, 110 is maintained by check valve 88 in series with pump 86.

The remaining portions of source 10 serve to move vertical pistons 112a, b in reciprocating (oscillatory) motion. DC magnetic field coils 128a, b, respectively, surrounding pistons 112a, b, lie in a plane transverse to axis 103 and provide a steady state magnetic field to moving coils 158a, b, respectively, using magnetic yokes 129a, b. Coil supports 156a, b, a part of pistons 112a, b, are positioned by springs 144a, b, respectively, to support moving coils 158a, b in the gaps of yokes 129a, b. Moving coils 158a, b also surround pistons 112a, b, respectively, and lie in an axially transverse plane. Thus, as alternating current is fed through moving coils 158a, b by wires (not shown) in cable 102, an alternating force is developed on pistons 112a, b, thereby causing them to alternately move inwardly to and outwardly from the center 160 of main chamber 110 thereby producing a corresponding pressure change in noncompressible fluid 50. The compressibility of fluid 70 at the other end of pistons 112a, b in chambers 136, 136' reduces the pressure change and hence the load on pistons 112a, b. Thus, by controlling the amplitude of the current fed to moving coils 158a, b, the oscillatory force on pistons 16a, b and pads 116a, b against wall 20 can be determined.

The frequency of seismographic energy generated by pads 116a, b thus depends directly upon the frequency of electrical energy applied to moving coils 158a, b. The frequency may be swept with time over a selected frequency band.

It is desirable to have a plurality of magnetic field coils 128a, b and moving coils 158a, b in order to facilitate the generation of the desired force on pads 116a, b.

In order to raise or lower source 10 after energization of coils 158a, b, it is necessary to reduce the preload or bias pressure inside main chamber 110 to be slightly lower than that of ambient fluid 72 so that the pads 116a, b will assume and remain in a retracted position in recess 161 away from wall 20. This is accomplished by opening valves 146, 84 to allow fluid 50 to flow from chamber 110 to chamber 80.

A relief valve 142 is also desirably disposed between chambers 152 and 80 to release pressure in chamber 152 below that of ambient fluid 72 when it is desired to move source 10 within the bore 12 in the event of failure of valve 84 to open after preload pressure exists in chamber 110. Also, pressure release valve 143 will operate to reduce the pressure of fluid 50 in chamber 110 if valve 146 fails to open when pressure on pads 116a, b is to be released. Pressure release valves 143, 84 may be actuated by pulling on cable 10 to increase the pressure of fluids 50, 70 by pistons 16a, b forced inwardly by the force produced by pads 116a, b and links 118. Once actuated by excess pressure, valves 143, 84 will remain open until the pressure falls to a predetermined amount where resetting of valves 143, 84 will occur.

Second piston 132 can be eliminated if either chamber 136, 136' contains a bladder 701 filled with compressible fluid 702, such as a gas or air, as in FIG. 2.

In summary, the downhole source 10 transmits energy to the earth through hydraulic pistons which press pads against the wall of the well or hole in the earth. In preparation of seismic energization of the source, the hydraulic pressure is raised or biased to a sufficient level to move the pads into position and to keep the pads in constant contact with the earth during the energizing cycle. The energy is transmitted by fluctuating the pressure above or about the bias pressure in a repeatable sweep of frequencies. The range of frequencies used may vary and the length of time for the total sweep of frequencies and the time for which any frequency is energized may vary.

The fluctuating pressure is produced in a preferred embodiment by energizing electromagnetic stages consisting of a moving electrical coil within a magnetic field. The magnetic field may be produced by permanent magnets or by a field coil. A fluctuating current in the moving coil will produce a fluctuating force on the driving piston rod thus producing the fluctuating hydraulic pressure. Any number of electromagnetic stages may be used to provide the desired source energy. These stages may be on one or both sides of the hydraulic pistons.

When the driving piston rod 112a, b is moved, the resulting volume change must be absorbed by a compressible device or fluid 70 which will allow it to move sufficiently to produce the desired pressure changes in the hydraulic fluid. The embodiment of FIG. 3 shows the compressible fluid as a separate fluid from the hydraulic fluid, however, it could be the same fluid if the "compressible" fluid reservoir 136, 136' is enough larger than the "hydraulic" fluid volume to make it sufficiently compressible for the movements required or if a gas is contained in reservoir 136, 136'.

A bias pressure is applied to the hydraulic and compressible fluids with a pump before the source is energized to produce seismic energy. After the bias has been obtained, the pressures of the hydraulic and compressible fluids are isolated to allow the pressure in the hydraulic fluid to oscillate relatively unimpeded by the compressible fluid pressure.

After the source is energized, the compressible and hydraulic fluid pressures are equalized and the valves holding the bias pressure is opened. With these valves open, the negative preload spring 120 will reduce the fluid pressures inside the source to a level below the ambient pressure of the fluid outside of the source. Under this condition, the ambient pressure will push the pads and pistons 16a, b to their retracted position. Alternately, the arms could be retracted with power. With the arms retracted, the source may be easily moved within the well by the structural electrical cable which provides electrical and physical connection to the surface unit.

Electronics may be installed in the source 10 for control of its functions and to feed back sensor information to a surface unit.

Other drivers such as magnetostrictive, piezoelectric or hydraulic pump with servo valve may be used instead of the electromagnetic stages of FIG. 3. The driver may also be located at the surface and the hydraulic pressure piped to the downhole source.

Having described preferred embodiments of the invention, numerous other variations may now become apparent to those skilled in the art. For example, the arrangement of moving and field coils shown in FIG. 3 might be used with the apparatus in FIG. 2. It is felt, therefore, that this invention should not be limited in scope to the particular embodiments described above, but only by the spirit and scope of the following claims.

What is claimed is:

1. A seismographic source for a well bore containing a well bore fluid at an ambient pressure comprising:
   means for providing a first pressure to a first volume of a first fluid contained within said source said first pressure being substantially equal to but less than the ambient pressure of a well bore fluid at the location of said source in said well bore, said means for providing said first fluid first pressure comprising a first piston means responsive to said well bore fluid ambient pressure;
   means for sinusoidally increasing the first pressure of a second volume of said first fluid to a second pressure in said second volume greater than said ambient pressure;
   second piston means responsive to said second pressure of said first fluid in said second volume to provide a third pressure directly to a wall of said well bore, said third pressure being greater than said ambient pressure of said well bore fluid; and
   means changing the magnitude and frequency of said second pressure of said first fluid to produce a corresponding third pressure change in said responsive piston means resulting in seismic energy propagation in the earth surrounding said well bore.

2. A seismographic source for a well bore containing a well bore fluid at an ambient pressure comprising:
   means for providing a first pressure to a first volume of a first fluid contained within said source, said first pressure being substantially equal to but less than the ambient pressure of a well fluid at the location of said source in said well bore;
   means for increasing the first pressure of a second volume of said first fluid to a second pressure in said second volume greater than said ambient pressure;
   piston means responsive to said second pressure of said first fluid in said second volume to provide a third pressure directly to a wall of said well bore, said third pressure being greater than said ambient pressure of said well bore fluid;
   means changing the magnitude and frequency of said second pressure of said first fluid to produce a corresponding third pressure change in said responsive piston means resulting in seismic energy propagation in the earth surrounding said well bore;
   said means for providing a first pressure to a first fluid comprising:
   a first chamber containing said first fluid;
   a first piston movable in said first chamber in contact with and responsive to the ambient pressure of said well bore fluid and in contact with and providing said first fluid with said first pressure; and a spring in said first chamber in contact with and resisting movement of said first piston providing a force on said first piston equal to the difference in the pressure of said first fluid on said first piston and the pressure of said ambient well bore fluid on said first piston.

3. The source of claim 2 wherein said means for increasing the first pressure of said first fluid to a second pressure comprises:
a second and third chamber each containing said first fluid; and
a first pump connected between and increasing fluid pressure between said second and third chambers to provide said second pressure in said first fluid in said second chamber.

4. The source of claim 3 wherein said means for providing a third pressure to the wall of said well bore comprises:
a second piston responsive to the first and second fluid pressure of said third chamber;
said second piston being oriented transversely to said wall;
said second piston being retracted into said source in response to said first fluid pressure;
said second piston applying a predetermined force against said well bore wall in response to said second fluid pressure.

5. The source of claim 4 wherein said changing means comprises:
a control valve communicating with said second and third chambers;
a second pump having an inlet port in the fluid of said second chamber and an outlet port in said third chamber;
said fluid in said second chamber being a compressible fluid;
said third chamber containing a noncompressible fluid;
said control valve being operated to open and close to provide said changing of said third pressure of the fluid in said third chamber.

6. The source of claim 4 wherein said third chamber comprises a fourth and fifth chamber;
said fourth chamber contains a compressible fluid;
said fifth chamber contains said second piston and an incompressible fluid;
a third piston between said fourth and fifth chambers; and
means for moving said third piston relative to said fourth and fifth chambers to oscillatorily increase and decrease the noncompressible fluid pressure in said fifth chamber to thereby apply oscillatory pressure to said transverse second piston.

7. The source of claim 4 wherein:
said means for changing the magnitude and frequency of said second pressure of said first fluid comprises:
said first fluid being substantially noncompressible;
a fourth chamber containing a compressible fluid comprising said fluid and a gas valve;
a third piston located between said third chamber and said fourth chamber responsive to the pressure of said fluid in said third chamber to compress the fluid in said fourth chamber to the same pressure as the fluid in said third chamber;
a fourth piston between said fourth chamber and said third chamber containing said third piston; and
means for moving said fourth piston to oscillatorily change the pressure of the first fluid in said third chamber portion and hence provide an oscillatory pressure to said second piston.

8. The source of claim 4 wherein said means for providing a third pressure to said well bore wall further comprises:
a pad in slidable contact with an outer end of said second piston;
a cable attached to one end of said source;
a link hingedly connected to said source at one link end and to said pad at the other link end;
said link connection to said source being nearer to said cable attachment than the second piston;
said pad being substantially transverse to said second piston.

9. The source of claim 8 comprising:
said pad having a reentrant groove in the axial direction;
said second piston having an end cap held captive in said reentrant groove with said end cap being slidable within said reentrant groove.

10. A seismographic source for a well bore containing a fluid comprising:
a first chamber containing an opening in communication with well bore fluid;
a second chamber;
a first piston forming a first common wall of said first and second chambers;
a first spring in contact with opposite walls of said second chamber, one of said opposite walls being said first piston;
a third chamber having a wall in common with said second chamber;
an incompressible fluid in said second and third chambers;
a pump for increasing the pressure of said fluid in said third chamber over that of said second chamber;
a fourth chamber containing a compressible fluid;
a second piston forming a second common wall of said third and fourth chambers;
a fifth chamber;
a fluid conducting pipe and a first valve serially connected between the outlet of said pump and said fifth chamber;
a third piston at one end in contact with the fluid in said fifth chamber and at its other end in contact with a wall of said well bore;
said third piston being responsive to the pressure of said fluid in said fifth chamber to provide a corresponding pressure on said wall;
a fourth piston having two opposite ends, one end in contact with the fluid in said fifth chamber and having its other end in contact with the fluid in said fourth chamber; and
means for oscillatorily moving said forth piston to provide an oscillatory pressure change in the fluid of the fifth chamber and therefore to said third piston and to the wall with which said third piston is in contact.

11. The seismographic source of claim 10 wherein said means for oscillatorily moving said fourth piston comprises:
a coil attached to said fourth piston;
means providing a magnetic filed in which said coil is immersed; and
means providing an alternating current to said coil of predetermined amplitude and frequency.

12. The seismographic source of claim 10 wherein said third piston comprises:
a pad at the end of said piston nearest said wall;
a link connected at one end to said source and at its other end to said pad;
a cable attached to one end of said source;
said link end connected to said source being nearer to said cable than said link end connected to said pad.

* * * * *